US006757686B1

(12) United States Patent
Syeda-Mahmood et al.

(10) Patent No.: US 6,757,686 B1
(45) Date of Patent: Jun. 29, 2004

(54) METHOD AND APPARATUS FOR REPRESENTING DATABASE AND QUERY INFORMATION USING INTERVAL HASH TREE

(75) Inventors: Tanveer Fathima Syeda-Mahmood, Cupertino, CA (US); Prabhakar Raghavan, Saratoga, CA (US); Nimrod Megiddo, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 667 days.

(21) Appl. No.: 09/593,131

(22) Filed: Jun. 14, 2000

(51) Int. Cl.$^7$ .............................................. G06F 17/30
(52) U.S. Cl. .................... 707/100; 707/104.1; 707/3; 707/6
(58) Field of Search ...................... 707/1, 3, 6, 104.1, 707/100

(56) References Cited

U.S. PATENT DOCUMENTS

| 5,875,445 A | * | 2/1999 | Antonshenkov | 707/2 |
| 5,920,857 A | * | 7/1999 | Rishe et al. | 707/3 |
| 6,321,232 B1 | * | 11/2001 | Syeda-Mahmood | 707/104 |
| 6,505,191 B1 | * | 1/2003 | Baclawski | 707/3 |

* cited by examiner

Primary Examiner—Shahid Alam
Assistant Examiner—Cam-Y Truong
(74) Attorney, Agent, or Firm—Daniel E. Johnson; McGinn & Gibb, PLLC

(57) ABSTRACT

A method and system for representing database and query information for multiple windows, includes defining an interval hash tree as a two-way interval tree, constructing a first interval hash tree for database windows, constructing a second interval hash tree for query windows, and matching the second and first interval hash trees node by node.

25 Claims, 11 Drawing Sheets

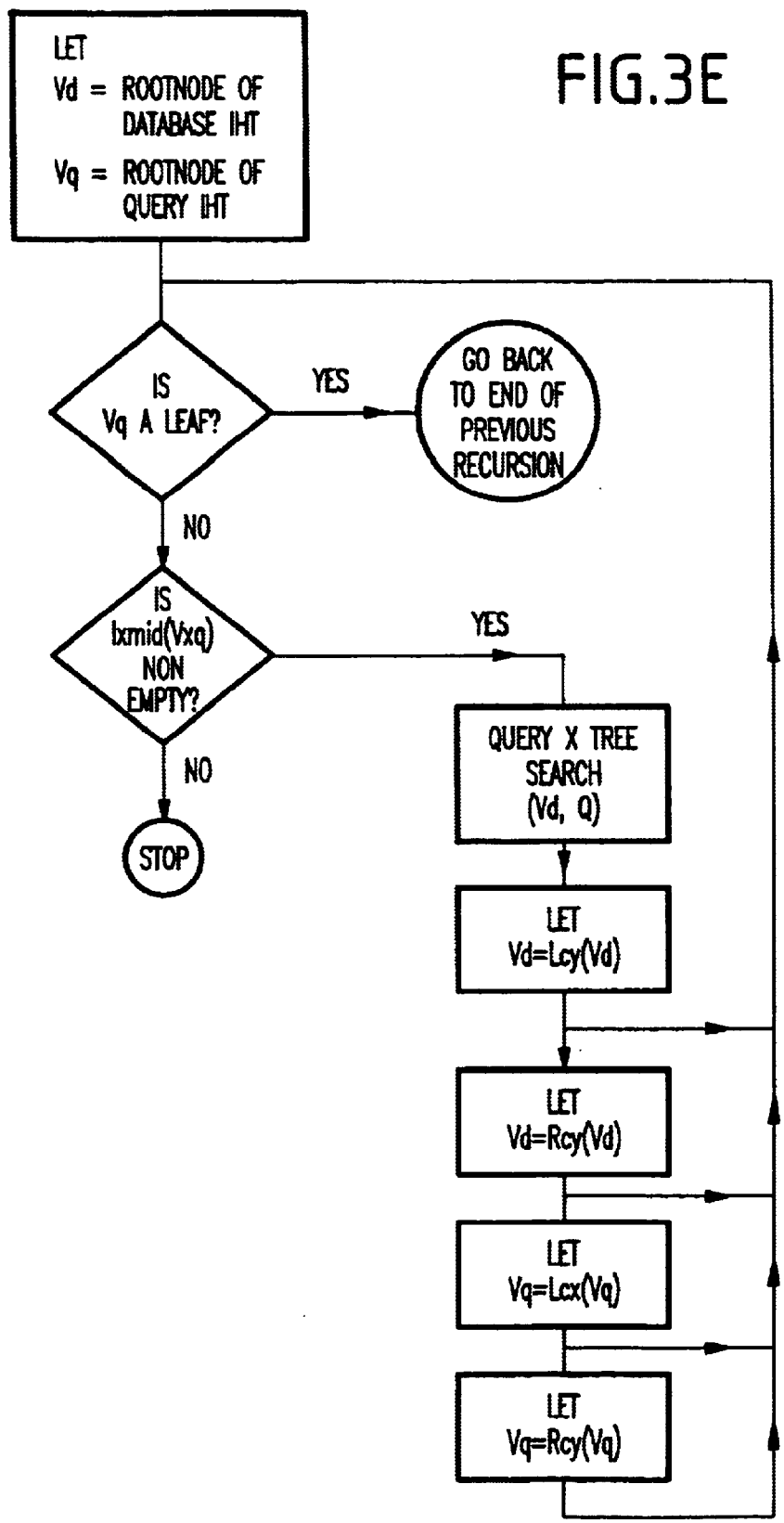

METHOD AND APPARATUS FOR REPRESENTING DATABASE AND QUERY INFORMATION USING INTERVAL HASH TREE

CROSS-REFERENCE TO RELATED APPLICATION

The present application is related to U.S. patent application Ser. No. 09/593,465, filed on Jun. 17, 2000, to Syeda-Mahmood, entitled "METHOD AND APPARATUS FOR LOCATING MULTI-COLORED OBJECTS IN AN IMAGE OR VIDEO DATABASE" having U.S. Pat. No. 6,691,126, assigned to the present assignee, and incorporated herein by reference.

BACKGROUND OF THE INVENTION

1. Field of the Invention

The present invention is directed to a method and apparatus for representing indexing information in a database, and more particularly to a method and system for representing indexing and query information using an interval hash tree to allow efficient query object localization.

2. Description of the Related Art

As image databases grow larger and larger in size, index structures for fast navigation become important. In particular, when the goal is to locate object queries in large image databases using their spatial layout information, traditional index structures used in databases such as B-tree, R-tree, R*-tree, etc., become unsuitable, especially, since the query object must be localized in the presence of pose changes, occlusions and spurious data in images.

More particularly, when the goal is to locate object queries in large image databases, it is desirable to avoid a detailed search of either the image database or the images themselves. This is due to several reasons.

First, without a perfect segmentation, it is not clear which collection of image regions comes from the query object without exploring multiple possibilities. This becomes very time-consuming, if not computationally prohibitive. This problem is made worse when changes in imaging conditions and pose changes alter the appearance of the object in images. Finally, occlusions and background clutter make it difficult to interpret partial object appearances. Robustly locating objects under these conditions requires efficient index structures that can consolidate pose-invariant information within and across images in a compact and efficiently searchable form. This problem is often recognized but has not been explicitly addressed prior to the present invention.

To illustrate the above problem, consider locating a query based on its spatial layout of regions. This requires modeling the layout of regions in images of the database, and representing the layout in a suitable index structure. The matching of the query regions then involves finding the best subset of image regions in the database that are likely to arise from the query object regions. Frequently, the information about the regions can be represented by suitable bounding boxes, which for scene regions are overlapping windows. Then, the query localization problem reduces to the problem of finding all the image database intervals that overlap with a set of query intervals.

An efficient data structure and algorithm for the solution to this problem is important not only in content-based retrieval of image databases, but also in a number of other applications such as map-based navigation systems, VLSI design and testing, and flight simulation.

For example, state-of-the-art cars are equipped with vehicle navigation systems that help the user determine his/her position and guide to the user to his/her destination. Such a system stores a whole roadmap of for example, the entire U.S. It also keeps track of where the user is, so that it can show the appropriate part of the roadmap at any time on a small computer screen. This will usually be a rectangular region around the user's present position.

To be of any use, the map should contain sufficient detail. A detailed map, however, contains an enormous amount of data, not all of which can be displayed on the screen at one time. In that case, given a query region isolated by a user, the system must find that part of the map (roads, cities, and so on) that lie in the window, and display them. This will require finding all regions of the map represented by possibly overlapping bounding boxes that overlap with the query window(s). Checking every single feature of the map to see if it lies inside the query window is not feasible due to the amount of data.

Traditional index structures are insufficient for object localization under the above circumstances. That is, while these data structures do address the search aspect, most of the conventional indexing structures are focused on reducing the seek time on disk reads for secondary memory data storage, and the robust localization aspect has not been well-addressed.

For example, R-trees and their variants [Guttman, Proc. SIGMOD, 1984, pp. 47–57, Beckman et al., Proc. SIGMOD, 1990, pp. 322–331, Sellis, Roussopolous and Faloustous, VLDB 1987, pp. 507–519, Katayama and Satoh, SIGMOD 1997, pp. 369–380 White and Jain, Int. Conf. On Data Engg., 1996, pp. 516–523, Robinson, Proc. SIGMOD 1981, pp. 10–18] assume the object-containing region in the image can be enclosed by bounding rectangles and focus on efficient grouping of the enclosing rectangles at successive levels to yield a balanced search tree that is optimized for disk accesses. The search for object queries in such index structures involves finding all database rectangles that overlap a query rectangle. Under changes in pose, the bounding rectangles undergo considerable change including translation, so that the search using these index structures no longer yields a match to the query. Other search trees such as k-D trees are used more for point searches than rectangle searches. That is, the database access problem addressed using those trees is determining the set of database points that fall within a single query rectangle. There is also prior art in addressing the general rectangle intersection problem [Six-Wood, BIT, vol. 20, pp. 426–433, 1980] where the problem is to determine the set of intersecting rectangles in a n-D plane. Efficient implementation of the rectangle intersection algorithm also exploit the 1d-interval tree, a data structure proposed by Edelsbrunner [Edelsbrunner, Rep. F59, Tech. Univ. Graz, 1980]. This invention proposes a 2D extension to the interval tree proposed by Edelsbrunner.

Thus while representing rectangles in a conventional spatial access structure such as an R-tree is a possibility, unless the search for all query intervals can be consolidated, this would be inefficient. Another possibility is to use an index structure such as a multi-dimensional hash table as done in geometric hashing. However, these tables would require quantizing the space of rectangles into cells and recording the presence of intervals in each cell, an operation that would be computationally prohibitive, both in storage space and in search time during indexing. Finally, graph-like representations that capture the layout of query or database rectangles are not suitable either due to the complexity associated with sub-graph matching.

Thus, representing database intervals in a manner that avoids a repetitious search for query affine intervals can be a difficult problem. In fact, it turns out this is a well-known problem in computational geometry, an efficient solution of which is needed in several applications besides image databases, such as map-based navigation systems, VLSI design and testing, and flight simulation, as discussed above.

What is needed is a representation of overlapping window information in a suitable index structure which can also be quickly searched to retrieve the relevant intervals. Further, when there are multiple query intervals, it would be advantageous to consolidate the multiple searches so as to avoid repetition.

SUMMARY OF THE INVENTION

In view of the foregoing and other problems, disadvantages, and drawbacks of the conventional methods and structures, an object of the present invention is to provide a method and structure in which the above problems are solved.

In a first aspect of the present invention, a system and method for representing database information for multiple windows using a two-way interval tree called the interval hash tree is presented. A second aspect of the present invention is the notion of representing the query interval information also as an interval hash tree and matching the query interval tree nodes to the database interval tree nodes in a manner that avoids redundant exploration of nodes for overlapping query intervals.

Thus, with the unique and unobvious features of the present invention, a method and system are provided for supporting fast indexing of spatial layout queries. Moreover, the invention creates a novel data structure called the 2-way interval hash tree. The method of matching query and interval hash trees nodes for nodes is the first method that can find simultaneously the set of database windows that overlap a set of query windows without ever repeating the search for overlapping query windows. Finally, representing and indexing of overlapping database intervals allows a novel way of locating object queries that avoids repetitious search of the database, and has implications as a new addition to index structures available to spatial databases.

BRIEF DESCRIPTION OF THE DRAWINGS

The foregoing and other purposes, aspects and advantages will be better understood from the following detailed description of a preferred embodiment of the invention with reference to the drawings, in which:

FIG. 2(a) illustrates regions in an example object;

FIG. 2(b) illustrates overlapping windows, and more particularly the affine intervals (rectangles) of the spatial layout of all regions with respect to region 1 using the middle basis triple from those on the boundary curve of region 1e.

FIG. 2(c) illustrates an interval hash tree for the rectangles in FIG. 2(b);

FIG. 3E illustrates a flowchart of a top-level search of query and data base interval hash trees;

FIG. 4(a) illustrates the problem of finding overlap between query and database rectangles, the database rectangles being labeled R11, R12, etc., and the query rectangles being labeled Rpp, Rpt, etc.;

FIG. 4(b) illustrates the interval hash tree of the query rectangles shown in FIG. 4(a); and FIG. 4(c) illustrates the search path taken during matching of query IHT nodes to database IHT nodes for this example;

DETAILED DESCRIPTION OF PREFERRED

Embodiment of the Invention

Figure 1:
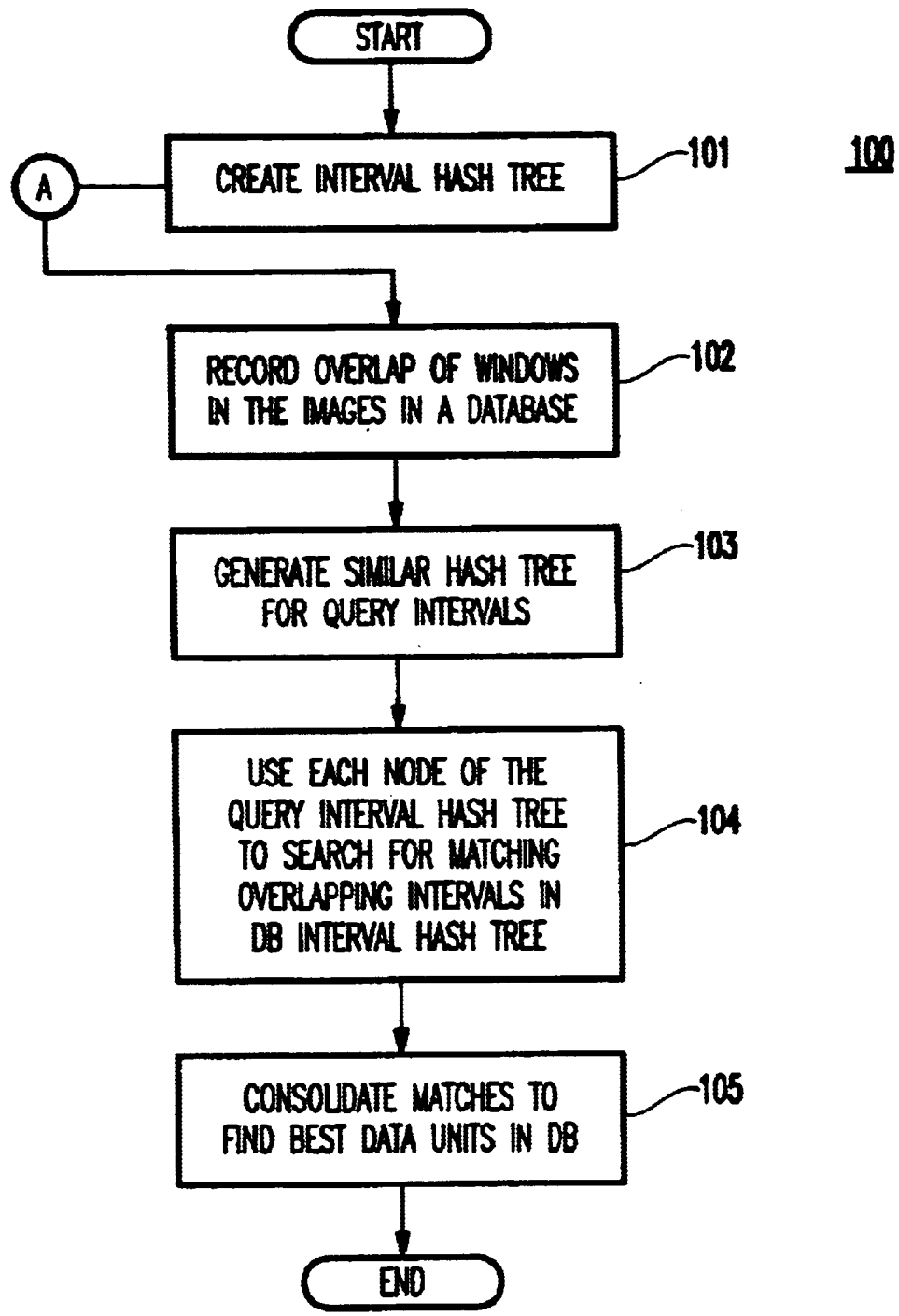
FIG. 1 illustrates a method 100 of representing database and query information for multiple windows according to the present invention.

Referring now to the drawings, and more particularly to FIGS. 1–6, there are shown preferred embodiments of the method and structures according to the present invention.

Generally, the present invention provides a novel index structure called an interval hash tree that is used to represent overlapping window information in both the database and the query.

Specifically, the interval hash tree (IHT) is a two-way interval tree for storing rectangular regions. If elements of a database and a query can be represented by a collection of rectangular regions, then the interval hash tree data structure can be used to represent the combined information of the overlapping nature of database or query rectangles. The set of query rectangles that match a set of database rectangles is found efficiently by representing both database and query rectangles in separate interval hash trees and matching the trees node for node as will be described in detail below.

The purpose behind finding such a match is to accumulate evidence for as many query rectangles as possible, and hence the name hash tree. Such an operation serves different purposes in different applications. Thus in the case of image databases, such an indexing operation results in localizing object queries, particularly when the rectangles represent affine intervals.

The actual method of representing the spatial layout of objects through affine intervals, and the use of interval hash tree to find regions in images of a database that contain possible appearances of query objects, is termed region hashing, and is the subject of another related invention as disclosed in the above-mentioned commonly assigned U.S. patent application Ser. No. 09/59,3469, U.S. Pat. No. 6,691, 126 to T. Syeda-Mahmood, incorporated by reference, concurrently filed herewith and having IBM Docket No. AM9-99-0238. Next, if the query rectangles represent map regions, then the same method of finding overlapping intervals using interval hash tree can be applied to the problem of determining map areas spanned by a query area and is of use in car navigation systems. Finally, if the query rectangles represent regions on a chip, then finding overlapping rectangles has implications in chip design and routing.

The interval hash tree has several desirable properties. First, it is a balanced binary search tree on each of the coordinates (x and y). Secondly, the tree can be constructed in time O(nlogn) for n elements. Third, each database rectangle, and hence the region in space spanned by it, is represented only once in the tree giving rise to storage efficiency (O(n) for n elements) unlike in the case of data structures such as R-trees in which the same space is represented multiple times through hierarchical region grouping. Next, using a balanced binary search tree based on median-based partitioning of space, the search for overlapping intervals for a single query interval is made efficient. Finally, the search for matching database rectangles for each query is made efficient by consolidating the query rectangles in a query IHT, and carefully exploring node-by-node matching so as to avoid repeated exploration of database IHT.

In general, as described above, the windows (or 2-dimensional intervals) come from several data units in the database. For example, in the case of an image database, each image is a data unit, and is represented by multiple, possibly overlapping windows. The windows in turn, can represent several different types of information.

For example, in a simple case, the windows can be the bounding boxes of color regions found in images. In a more complex situation, the windows could represent the range in which affine coordinates of features of a region lie, when computed with respect to features within the region itself or with respect to features from other adjacent regions.

Turning to FIG. 1, a methodology 100 of the present invention will be described. As shown in FIG. 1, first in step 101, the interval hash tree is created, as described below (and shown in greater detail in the method of FIG. 3A).

Then, in step 102, the overlapping of windows in the images of the database are recorded in the interval hash tree.

Then, in step 103, a second, similar interval hash tree is generated for query intervals.

Thereafter, in step 104, each node of the query interval hash tree is used to search for matching overlapping intervals in the database interval hash tree.

Finally, in step 105, the results of matches of all nodes of the query interval hash tree are consolidated to find the best data units (e.g., Images) in the database likely to contain the query. The various operations involving the interval hash tree are described in detail below.

An interval hash tree (IHT) is a two-dimensional interval tree, extending the concept of 1d interval trees known in computational geometry to organizing a set of second intervals as balanced binary search trees.

Figure 2A:
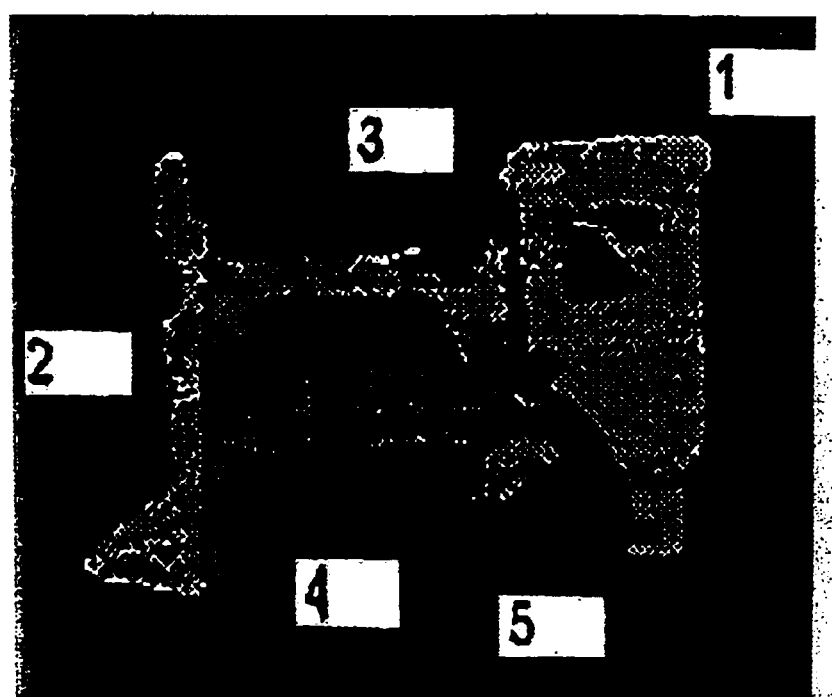
FIGS. 2(a)–2(c) illustrate affine intervals and their corresponding interval hash tree (IHT), and more specifically.
Figure 2B:
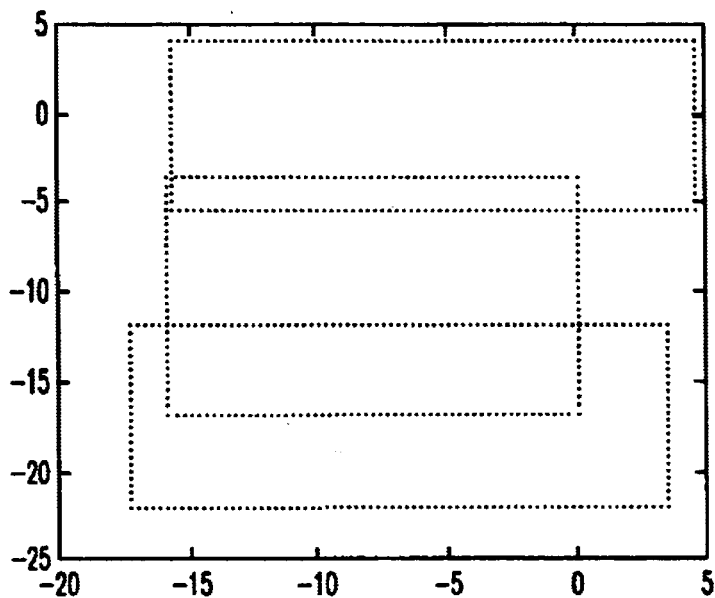

As shown exemplarily in FIG. 2(b), the overall tree is organized as an interval tree on one of the coordinates called the x-coordinate. If the windows are in cartesian coordinates, then it is indeed, the x-coordinate. If the coordinates are in affine coordinates, then the x-coordinate stands for the alpha-coordinate. As would be known by one of ordinary skill in the art taking the present specification as a whole, for other applications there may be other coordinate interpretations.

Next, the central branch node at each level is further organized as an interval tree based on the other coordinate called the y-coordinate, which is the y-coordinate in the Cartesian system or the beta-coordinate in case of an affine-base.

Although not described in detail herein, the interval hash tree can be generalized so that it can be a multi-level interval tree, with nodes at successive levels being further expanded into interval trees using successive coordinates to represent multi-dimensional overlapping windows in databases (e.g., rather than the two-dimensional case being described herein). Thus, the invention is scalable to multiple dimensions and is not just limited to the exemplary two-dimensional case being described herein.

Interval Hash Tree Construction

Figure 3A:
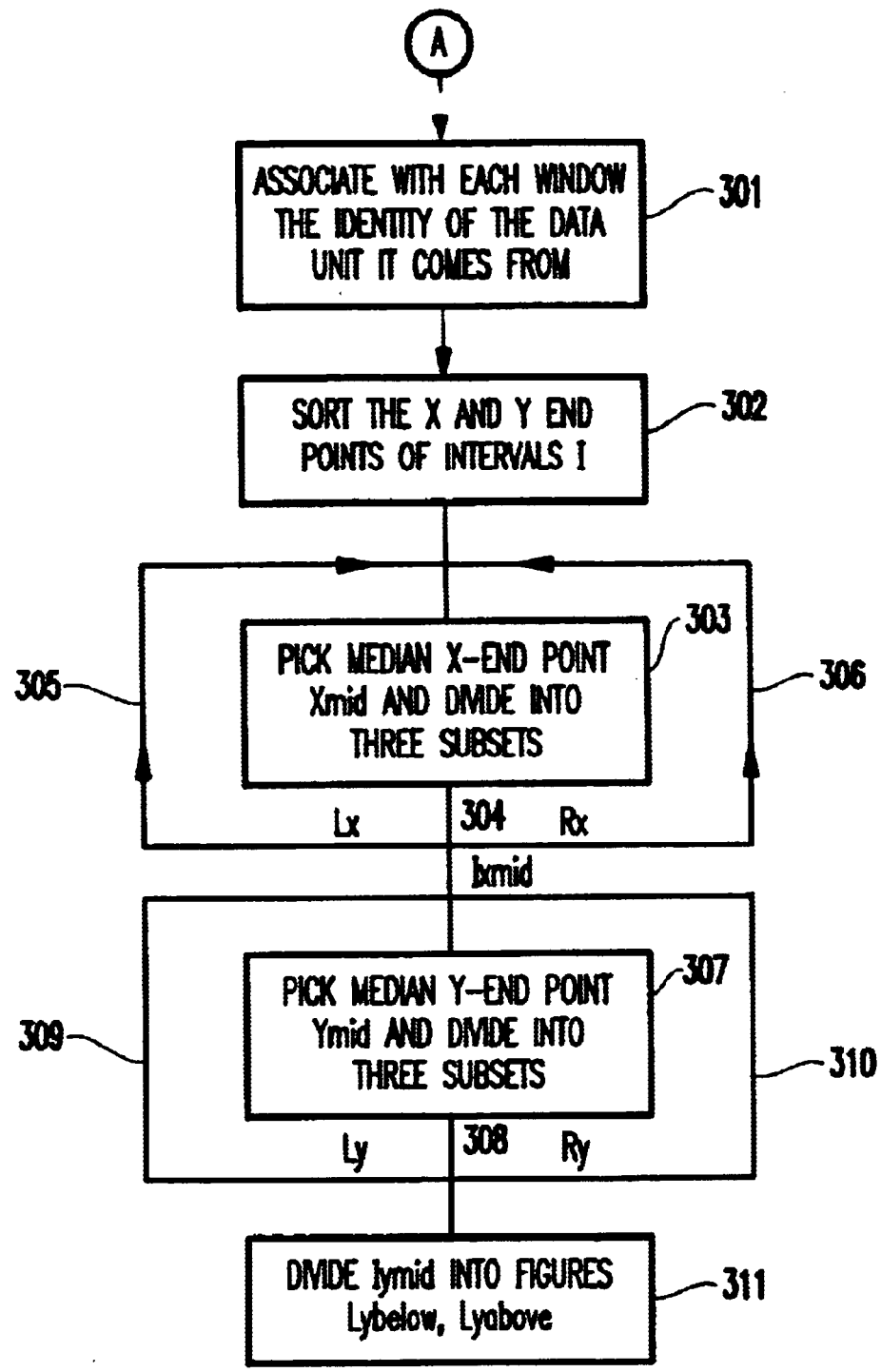
FIG. 3A illustrates a method of constructing an interval hash tree (IHT) according to the invention.

FIG. 3A illustrates a brief flowchart of the method of constructing the interval hash tree, and its steps are described below.

Briefly, to construct the interval hash tree, first in step 301 associate with each rectangle, the identity of the data units it comes from. In the case of region hashing, this involves associating with each rectangle (affine interval) its image index, its region pair index, and the basis triple index. That is, with each affine interval $\{(\alpha_{mim}, \beta_{min}), (\alpha_{max}, \beta_{max})\}$ is associated with the set $\{R_i, R_j, I_p, B_{ik}\}$ where $I_p$ is the image within which region pairs $(R_i, R_j)$ are present, and where the affine coordinates of features of region $R_j$ computed with respect to a basis triple $B_{ik}$ in region $R_i$ lie in the stated affine interval.

This allows the consolidation and hence direct indexing of all images in the database and the locations within images (as indicated by the regions $(R_i, R_j)$) and the basis features $B_{ik}$ which contain potential matches to a query affine interval and hence its associated query region pairs.

The resulting set of rectangles are sorted based on the first coordinate (i.e. the α coordinate) (step 302). Let the sorted set of intervals be denoted by I. Let Xmid be the median end point in set I (step 303). The interval I is split into three subsets, namely, $I_{xleft}$, $I_{xright}$, and $I_{xmid}$, to correspond to the set of intervals whose left and right x-end points are to left of Xmid, to the right of Xmid, and whose left x-end point is to the left and right x-end points are to the right of Xmid respectively (step 304). A bounding rectangle for the rectangles spanned by the set I can additionally be included for ease of searching at the node.

The interval $I_{xmid}$ then forms the central branch of a node of the x-interval tree and the $I_{xleft}$ and $I_{xright}$ form left and right subareas (denoted by Lcx(Vx) and Rcx(Vx)) of the node Vx of the x-interval tree as indicated below:

$$V_{xI} = \{(X\text{mid}, V_{yIxmid}), Lcx(V_x) = V_{IxleftI}, Rcx(Vx) = V_{xIxright}\} \quad (1)$$

Each of the left and right subareas are recursively constructed in a similar manner (steps 305 and 306) by repeatedly picking their median x-end point and splitting into three subsets explained above. The algorithm for the x-interval tree construction directly follows from the description of the node above.

The central branch of each node of the x-interval tree Ixmid is organized as a y-interval tree as follows. The set $I_{xmid}$ of affine intervals is now sorted based on the second coordinate, and the median y-end point Ymid is picked (step 307). The set $I_{xmid}$ is then divided into three subsets, $I_{ybelow}$, $I_{yabove}$ and $I_{ymid}$ (step 308) that contain affine intervals whose above and below y-end points are below Ymid, above Ymid, and whose above and below y-end point are on either side of Ymid respectively. A bounding rectangle of the set $I_{xmid}$ can additionally be stored at this node for ease of interval search. The interval $I_{ymid}$ then forms the central branch of a node of the y-interval tree and the $I_{ybelow}$ and $I_{yabove}$ form left and right subareas (denoted by Lcy(Vy) and Rcy(Vy)) of the y-interval tree node $V_y$ as indicated below.

$$V_{yIxmid} = <(I_{ymid} = \{L_{Yabove}, L_{Ybelow}\}, Ymid, Data(V_{yIxmid})), Lcy(V_Y) = V_{yIybelow}$$ (2)

$$Rcy(V_Y) = V_{YIyabove}>$$ (3)

The set $I_{ymid}$ is actually represented as two lists $L_{Ybelow}$ and $L_{Yabove}$ that capture the below and above end-points respectively, of the intervals in $I_{xmid}$ which straddle Ymid (step 311). $L_{Ybelow}$ sorted in increasing order while $L_{Yabove}$ is sorted in decreasing order to enable range searching as we will show later. Finally, the above and below branches of the y-interval tree are recursively generated by going back to step 307 (as indicated by steps 309, 310). It is noted that unlike in the case of non-leaf nodes of the x-interval tree, the data associated with rectangles is listed under the central branch of a node in the y-interval tree. In the case of region hashing, this data constitutes the image index, the region index, and the basis triple index, necessary for query localization.

Figure 2C:
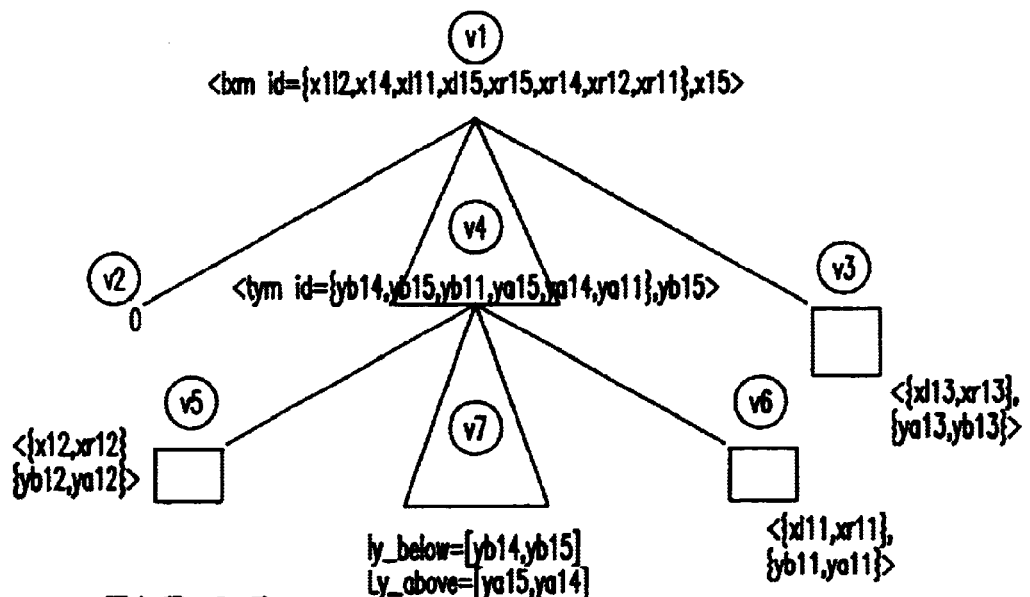

FIG. 2(c) depicts an interval hash tree for a set of rectangles (affine intervals). These intervals are obtained by pairing region marked 1 on the object depicted in FIG. 2(a) with respect to all other marked regions on the object. The affine intervals themselves are indicated in FIG. 2(b). Here Xlij, Xrij stand for the left and right end points of the affine interval of region j computed with respect to a basis triple in region i (in this case, the middle basis triple on region 1's contour). The empty branches of the tree are denoted by circles and single interval branches by the interval itself. Although the lists Ixmid and Iymid are indicated at the nodes for purpose of illustration, only the median point Xmid (Ymid) and the bounding rectangle of the intervals under a tree node are stored at each node. For a leaf node, this reduces to the affine interval itself.

Thus, to construct an interval hash tree from a database of windows preferably includes the following steps (or equivalents thereof), as shown in FIG. 3A. That is, the interval hash tree construction includes first associating with each window, the identity of the data unit it comes from. Thus, if the data unit in the database is an image, then associate with the window, the number of the image that contains it.

Then, sort the windows using one of the coordinates, called, the x-coordinate. Let the sorted windows be denoted by the set I.

Thereafter in step 1013, the X-interval hash tree is constructed by running CONSTRUCT_X_INTERVAL_HASH_TREE(I) algorithm.

The x-interval hash tree in turn is constructed using the y-interval hash tree by running CONSTRUCT_X_INTERVAL_HASH_TREE(I) as follows.

First, if the set I is an empty set, then an empty leaf is returned. Otherwise (e.g., set I is not an empty set), then a node $V_x$ is created by picking a median coordinate Xmid of the set I and storing Xmid with V.

Then, three intervals, called $I_{xleft}$, $I_{xright}$, and $I_{xmid}$, are computed. $I_{xleft}$ is the set of windows whose left and right x-end points are to the left of Xmid. Ixright is the set of windows whose left and right x-end points are to the right of Xmid. Finally, $I_{xmid}$ is the set of windows whose left-x-end point is to the left of Xmid, and whose right x-end-point is to the right of the Xmid.

Thereafter, the windows left in $I_{xmid}$ are sorted based on their second coordinate (again, this example assumes a two-dimensional case), called the y-coordinate (In the case of affine coordinates, the y-coordinate is the beta-coordinate).

Then, for Vy=CONSTRUCT_Y_INTERVAL_HASH_TREE($I_{xmid}$), store a pointer to Vy at node $V_x$ and repeat the above steps on the $I_{xleft}$ and let Lcx($V_x$).

To construct the interval hash tree for $I_{xleft}$, run CONSTRUCT_X_INTERVAL_HASH_TREE($I_{xleft}$), in which the above steps are repeated for the $I_{xright}$, and let Rcx($V_x$).

To construct the interval hash tree for Iright, run CONSTRUCT_X_INTERVAL_HASH_TREE(Ixright), in which Lcx is made the left child of $V_x$ and Rcx is made the right child of $V_x$. Then, $V_x$ is returned.

The y-interval hash tree in turn is constructed using the following steps.

CONSTRUCT_Y_INTERVAL_HASH_TREE($I_{xmid}$)

First, if $I_{xmid}$=empty set, then an empty leaf is returned. Otherwise, a node Vy is created and Ymid, the median point in the sorted list Imid, is computed and Ymid is stored with Vy.

Then, three intervals called $I_{yabove}$, $I_{ybelow}$, $I_{ymid}$, are computed. $I_{yabove}$ is the set of windows whose above and below y-end points are above Ymid. $I_{ybelow}$ is the set of windows whose above and below y-end points are below Ymid. $I_{ymid}$ is the set of windows whose above y-end points are above Ymid, and whose below y-end points are below Ymid.

Thereafter, the Iymid list is divided into two sublists called $L_{yabove}$(Vy) sorted on the above y-end point, and $L_{ybeow}$(Vy) sorted on the below y-end point. Then, these two lists are stored at Vy.

Then, the above is repeated for the $I_{yabove}$ list, and let Lcy(Vy)

Then, CONSTRUCT_Y_INTERVAL_HASH_TREE ($I_{yabove}$) is run which includes repeating the above steps on the $I_{ybelow}$ list for Rcy(Vy).

Then, CONSTRUCT_Y_INTERVAL_HASH_TREE ($I_{ybelow}$) is run in which Lcy(Vy) is made the left child of Vy and Rcv(Vy) is made the right child of Vy, and (Vy) is returned.

Hereinbelow, a method of search for all overlapping database windows with a single query window will be presented. Then, such a method will be generalized to multiple query windows.

Searching for Overlap for a Single Query Window

Given an interval hash tree designated by a root (Vx) and a single query window Q=(Qlx, Qrx, Qay, Qby) where Qlx and Qrx are the left and right x-end points of the query window, and Qay, and Qby are the above and below y-end points of the query window, the following operations are used to search for all overlapping database windows.

QUERY_X_INTERVAL_HASH_TREE(Vx,Q)

First, it is determined if $V_x$ is not a leaf. If $V_x$ is not a leaf, and if Qix<Xmid($V_x$) and Qrx>Xmid($V_x$), then the $I_{xmid}$ portion of the tree is explored as QUERY_Y_INTERVAL_HASH_TREE(Vy,Q).

In this query, QUERY_X_INTERVAL_HASH_TREE (Lex($V_x$),Q) and QUERY_X_INTERVAL_HASH_TREE (Lex($V_x$),Q) are run.

Otherwise, if Qix<Qrx<Xmid($V_x$), then QUERY_Y_INTERVAL_HASH_TREE(Vy,Q) and QUERY_X_INTERVAL_HASH_TREE(Lex($V_x$),Q) are run.

Otherwise, QUERY_Y_INTERVAL_HASH_TREE (Vy,Q) and QUERY_X_INTERVAL_HASH_TREE(Rex ($V_x$),Q) are run.

Where the search within the $I_{xmid}$ portion of the tree is captured by QUERY_Y_INTERVAL_HASH_TREE invoked on the Vy node representing the y-interval tree, the operations for the querying of the y-interval tree are given below.

That is, first QUERY_Y_INTERVAL_HASH_TREE (Vy,Q) is run. That is, if Qay>Ymid(Vy) and Qby<Ymid (Vy), then all windows within the Iymid are determined to be overlapping. Then, the process walks along the list $L_{yabove}$(Vy) starting with the top-most endpoint and computes an overlap with all the windows spanned in $L_{yabove}$(Vy).

Then, QUERY_V_INTERVAL_HASH_TREE(Lcy(Vy),Q) and QUERY_Y_INTERVAL_HASH_TREE(Lcy(Vy),Q) are run.

Otherwise, if Qay>Qby>Ymid(Vy), then the process walks along the $L_{yabove}$(Vy) starting at the interval with the top-most endpoint, and all windows that contain Qby are reported. As soon as a window that does not contain Qby is met, then the process stops.

Then, QUERY_Y_INTERVAL_HASH_TREE(Lcy(Vy),Q) is run.

Otherwise, the query window is below Ymid, and the process walks along the $L_{ybelow}$(Vy) starting at the interval with the bottom-most endpoint, reporting all windows that contain Qay.

As soon as a window that does not contain Qay is met, then the process stops and QUERY_Y_INTERVAL_HASH_TREE(Rcy(Vy),Q) is run.

Figure 3B:
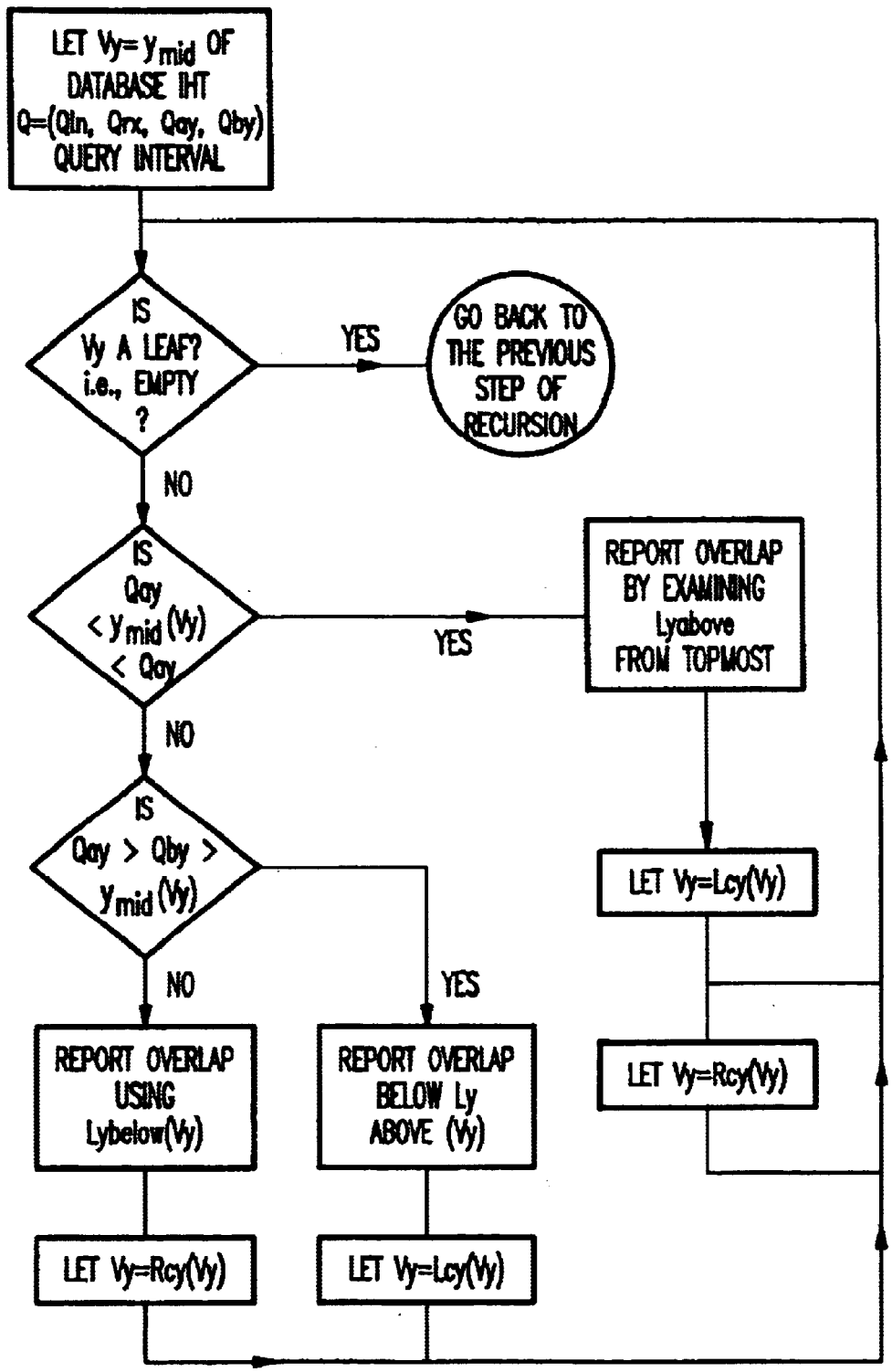
FIG. 3B illustrates a flow chart of a query y-interval hash tree step of searching an IHT using a single query window.
Figure 3C:
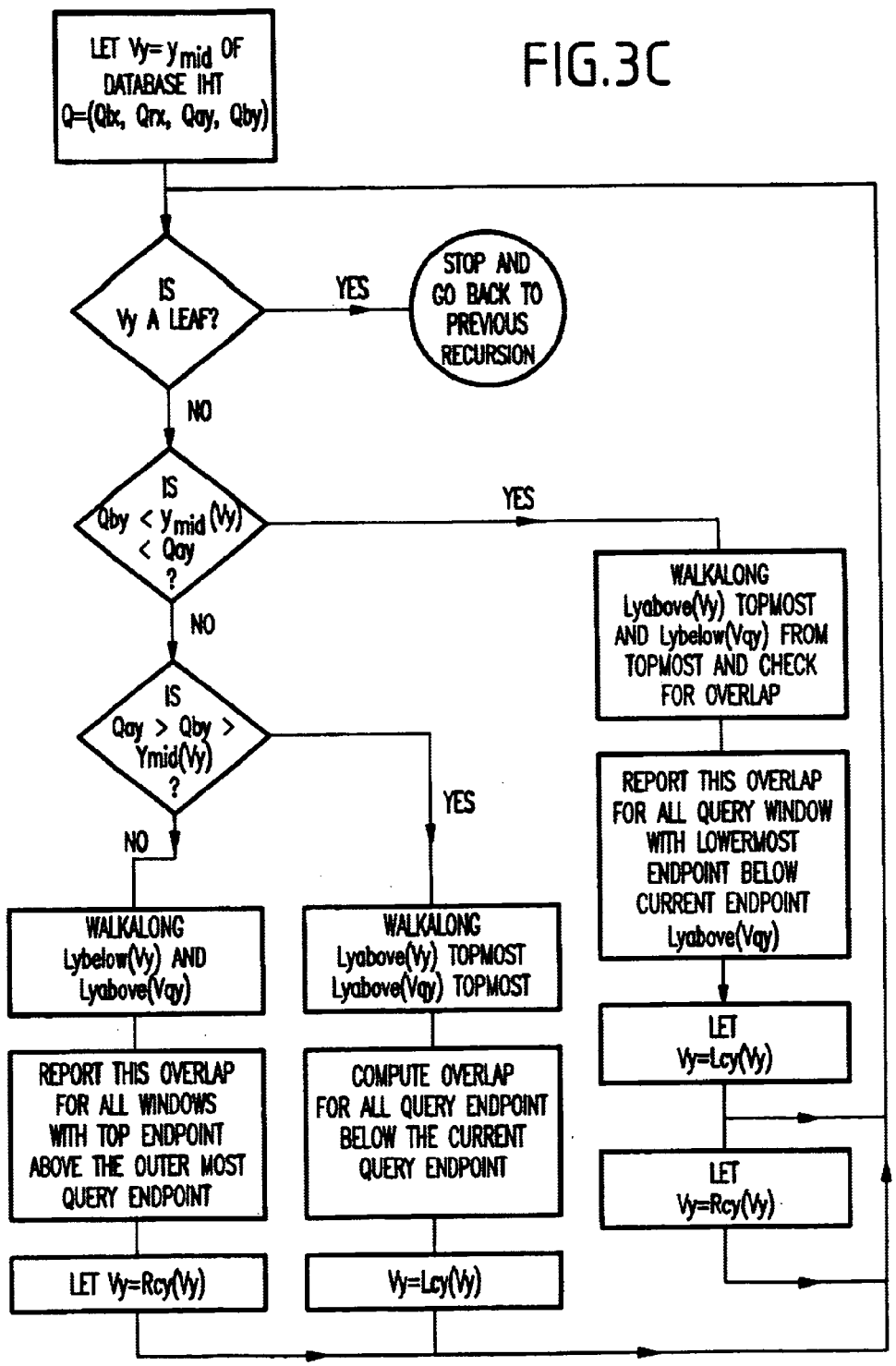
FIG. 3C illustrates a flowchart of a multiple query y-interval hash tree step of searching for multiple query windows.
Figure 3D:
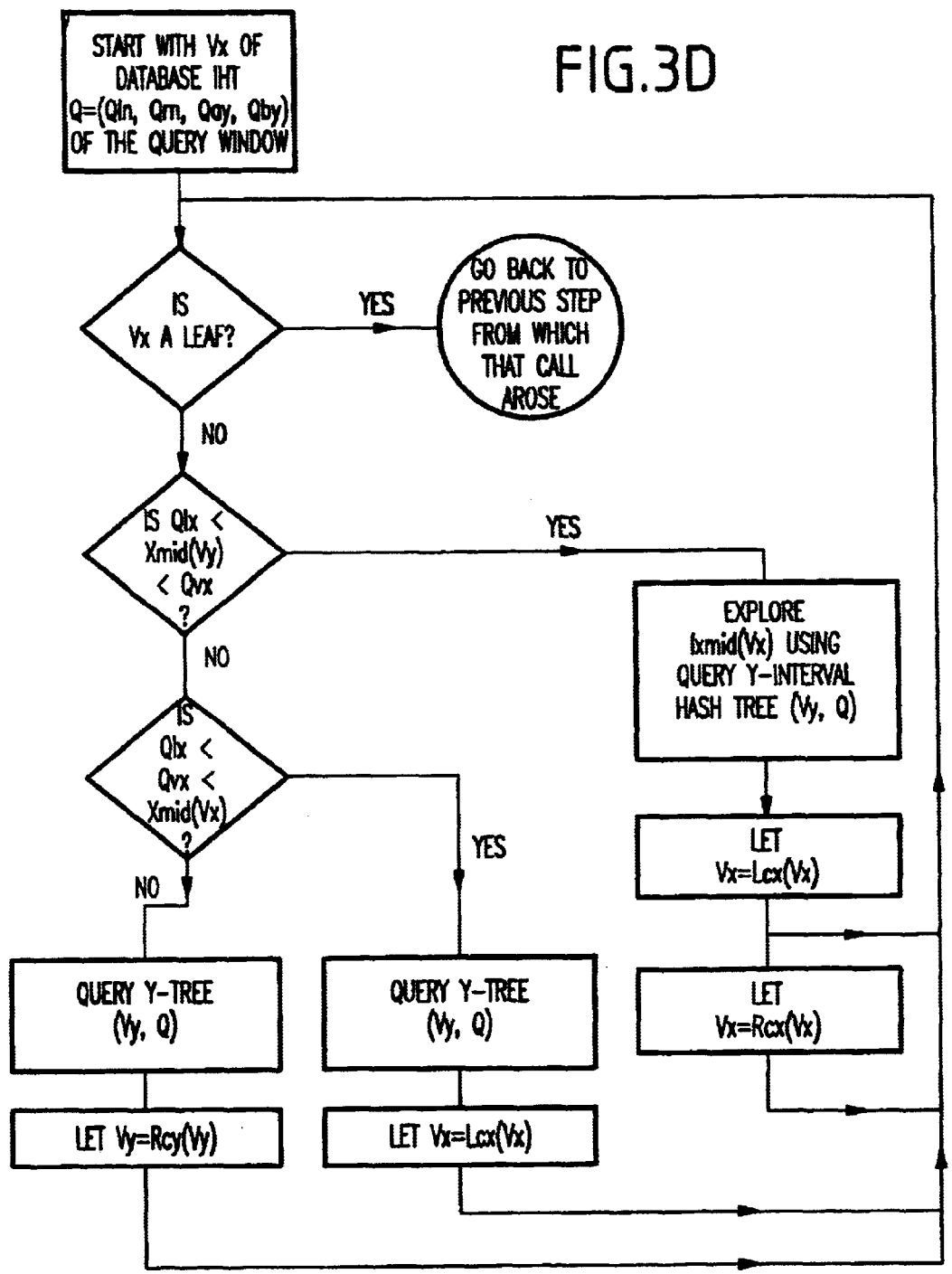
FIG. 3D illustrates a flowchart of a query-x-interval hashtree step of searching the IHT using a single query window.

FIG. 3B shows a flow chart of the query y-interval hash tree step of searching an IHT using a single query window, whereas FIG. 3D shows a flowchart of a query-x-interval hash tree step of searching the IHT using a single query window.

Searching for Multiple Query Windows

To search for multiple query windows, the above concept is extended by the invention to advantageously address the problem of searching for all database intervals that overlap with a given set of query intervals. The invention organizes the rectangles affine intervals of the query also as an interval hash tree, and performs a careful simultaneous search of database and query IHT in a way that maintains the property that a database interval that overlaps more than one query interval is discovered only once.

To perform this search, a version of the IHT construction is used that retains the bounding box of all affine intervals under a tree node (x or y-tree node) as part of the node information.

Using this additional piece of information and a pre-order traversal at both the x and y query IHT levels, nodes of the query IHT are successively searched against the nodes of the database IHT. Thus, at the x-level node $V_x$, the range (Qlx,Qrx) in which the left and right x-end points of the interval $I_{xmid}$ are noted along with $V_x$. Similarly, at the y-level node Vy, the range in which the top and bottom y-end points of windows (Qay,Qby) in the interval $I_{ymid}$ are stored at Vy.

Then, searching for multiple query windows is done by using the range at each node to identify candidate nodes to search in the database interval hash tree.

The search within the $I_{ymid}$ of a node is done by sequentially scanning bottom endpoints in reverse sorted order, and simultaneously incrementing the overlap count for all overlapping query windows.

The following algorithm does a pre-order traversal of the query interval hash tree, each such traversal results in updating the set of overlapping windows for each query window.

SEARCH_MULTIPLE_QUERY WINDOWS(Vd,Vq)

That is, if it is determined that Vq is not a leaf and if $I_{xmid}$(Vxq) is non-empty, then let Q=(Qlx,Qrx,Qay,Qby) be the range associated with Vqx and Vqy at this level.

Thereafter run MULTIPLE_X_INTERVAL_HASH_TREE(Vd,Q), SEARCH_MULTIPLE_QUERY_WINDOWS(Vd,Lcy(Vyq)), and SEARCH_MULTIPLE_QUERY_WINDOWS(Vd,Rcy(Vyq)). Also, run SEARCH_MULTIPLE_QUERY_WINDOWS(Vd,Lcx(Vxq)), and SEARCH_MULTIPLE_QUERY_WINDOWS(Vd,Rcx(Vxq)).

In the above, $V_x$ refers to the node of the database interval hash tree. The Q here stands for the query node which includes the windows spanned by the range (Qlx,Qrx,Qay,Qby) in the Iymid of the Vq, the current node being explored in SEARCH_MULTIPLE_QUERY_WINDOWS.

Then, an interval hash tree is created for supporting the searching of the multiple query windows in which MULTIPLE_X_INTERVAL_HASH_TREE(Vx,Q) is run.

That is, it is determined whether $V_x$ is a leaf or not. If $V_x$ is not a leaf and if it determined that Qlx<Xrnid($V_x$) and Qrx>Xmid($V_x$), then the $I_{xmid}$ portion of the tree is explored as MULTIPLE_QUERY_Y_INTERVAL_HASH_TREE(Vy,Q) is run. Then, MULTIPLE_QUERY_X_INTERVAL_HASH_TREE(Lcx($V_x$),Q) and MULTIPLE_QUERY_X_INTERVAL_HASH_TREE(Rcx($V_x$),Q) are run.

Otherwise, if Qlx<Qrx<Xmid($V_x$), then MULTIPLE_QUERY_Y_INTERVAL_HASH_TREE(Vy,Q) and MULTIPLE_QUERY_X_INTERVAL_HASH_TREE(Rcx($V_x$),Q) are run.

Otherwise, MULTIPLE_QUERY_Y_INTERVAL_HASH_TREE(Vy,Q) and MULTIPLE_QUERY_X_INTERVAL_HASH_TREE(Rcx($V_x$),Q).

To run MULTIPLE_QUERY_INTERVAL_HASH_TREE(Vy,Q), it is determined if Qay>Ymid(Vy) and Qby<Ymid(Vy) and if so, then the list $L_{yabove}$(By) is walked along starting with the top-most endpoint, and the overlap of all intervals spanned by (Qlx,Qrx,Qay,Qby) is computed as follows.

Starting with the window with the topmost endpoint in the $L_{ybelow}$(Vqy), all windows are reported that contain this end point as overlapping.

Then, report the above overlap for all query windows whose bottom-end points are below the current query end point.

Then, the above steps are repeated until all query bottom end points in $L_{ybelow}$ are exhausted.

Then, MULTIPLE_QUERY_Y_INTERVAL_HASH_TREE(Lcy(Vy),Q) and MULTIPLE_QUERY_Y_INTERVAL_HASH_TREE(Rcy(Vy),Q) are run.

If it is determined that Qay>Qby>Ymid(Vy), then the $L_{yabove}$(Vy) is walked along starting at the interval with the top-most endpoint, and the overlap of all intervals spanned by (Qlx,Qrx,Qay,Qby) is computed as follows:

First, starting with the window with the topmost endpoint in the $L_{ybelow}$(Vqy), all windows are reported that contain this end point as overlapping, and as soon as a window that does not contain this end point occurs, stopping at the last window.

Then, the above overlap is reported for all query windows whose bottom-end points are below the current query end point. Thereafter, MULTIPLE_QUERY_Y_INTERVAL_HASH_TREE(Lcy(Vy),Q) is run.

Otherwise (e.g., the query window is below Ymid), then the $L_{ybelow}$(Vy) is walked along starting at the interval with the bottom-most endpoint, and the overlap of all intervals spanned by (Qlx,Qrx,Qay,Qby) is computed as follows:

Starting with the window with the bottom-most top-end point in the $L_{yabove}$ Vqy), all windows that contain this end point are reported as overlapping, and as soon as a window that does not contain this end point occurs, stopping at this window.

Then, the above overlap is reported for all query windows whose top-end points are above the current query end point, and MULTIPLE_QUERY_Y_INTERVAL_HASH_TREE(Rcy(Vy),Q) is run.

Thus if the x and y-interval trees at the current query node are designated by $V_{qx}$ and $V_{qy}$, then the order of exploration is $V_{qx} \rightarrow \{V_{qy}, Lcy(V_{qy}), Rcy(V_{qy})\}$ followed by $Lcx(V_{qx})$ and $Rcx(V_{qx})$. For each such exploration against a database IHT node $V_d$, the bounding rectangle range (Qlx, Qrx, Qby, Qay) is used to determine which of the subareas to explore.

For example, if Qlx<Xmid $(V_{xd})$<Qly, then matching intervals can be found in either the y-interval tree under $V_{xd}$ i.e. $V_{yd}$, or the left and right subareas $Lcx(V_{xd})$ and $Rcx(V_d)$ of $V_{xd}$. The algorithm for searching x-interval hash tree is reproduced above.

Specifically, it uses the range (Qby, Qay), and the relative placement of the median point of query y-interval tree $Ymid(V_{qy})$ with respect to the median point $Ymid(V_{yd})$ of the database node to decide the order of exploration.

For example if Qby≦Ymid(Vyd)≦Qay, and $I_{ymid}$(Vqy) >$I_{ymid}$(Vyd), then by walking along Lybelow(Vqy) and Lyabove(Vyd) from their top-most end point, all database intervals can be reported that contain the current query end point. In addition, without further search, this overlap can be reported to hold for all query intervals in $V_{xq}$ whose bottom-end points are below the current query end point. This critical step avoids the repetitious search for multiple query intervals.

FIG. 3C shows a flowchart of the multiple query y-interval hash tree step of searching for multiple query windows whereas, FIG. 3E shows a flowchart of a top-level search of query and data base interval hash trees.

Example of Interval Hash Tree Search

Figure 4A:
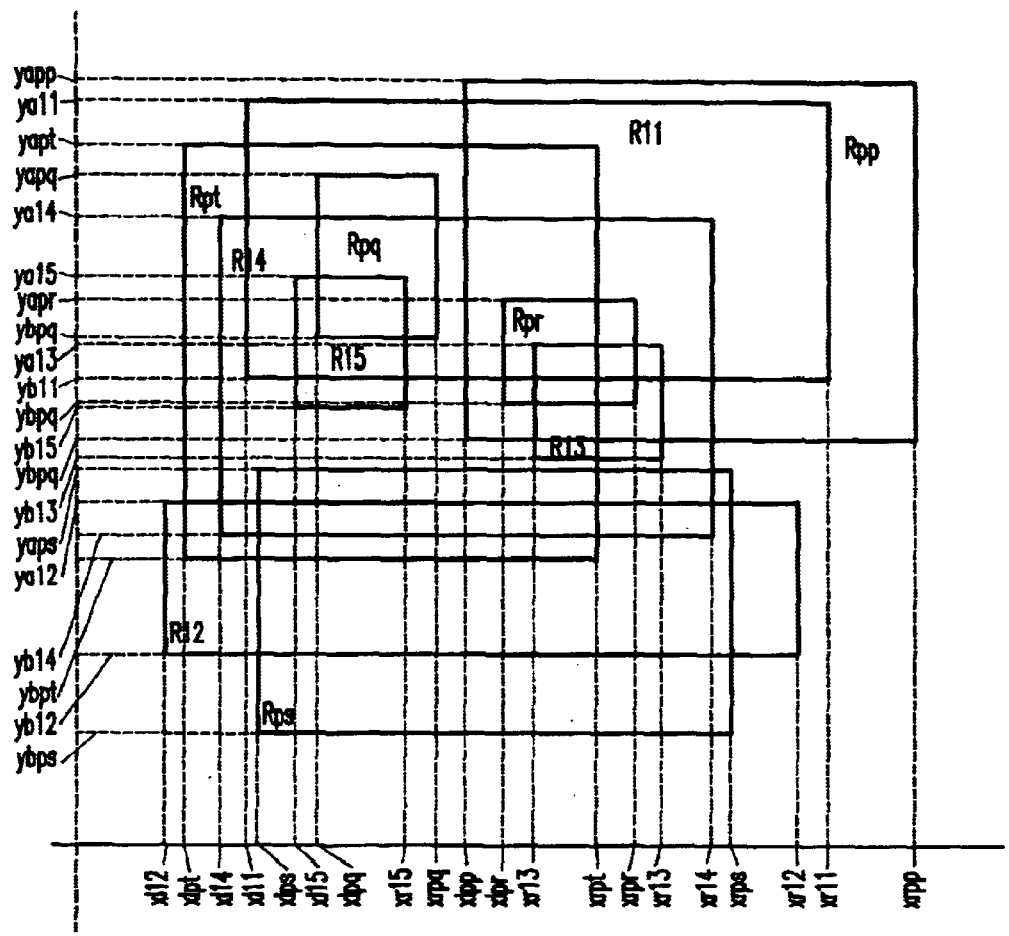
FIGS. 4(a)–4(c) illustrate an IHT search using a set of query rectangles, and more specifically.
Figure 4B:
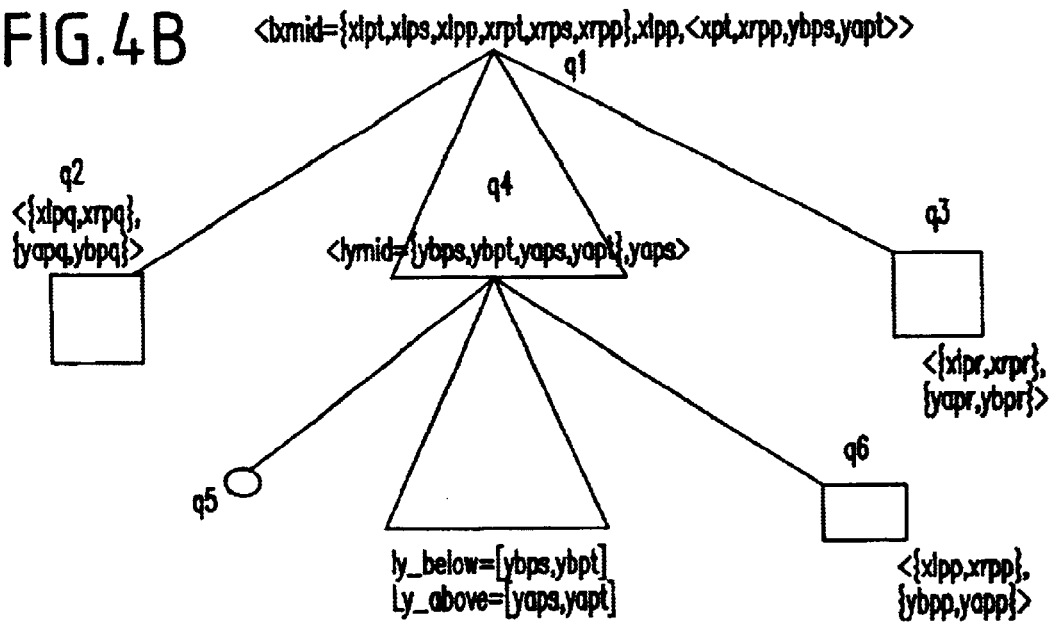
Figure 4C:
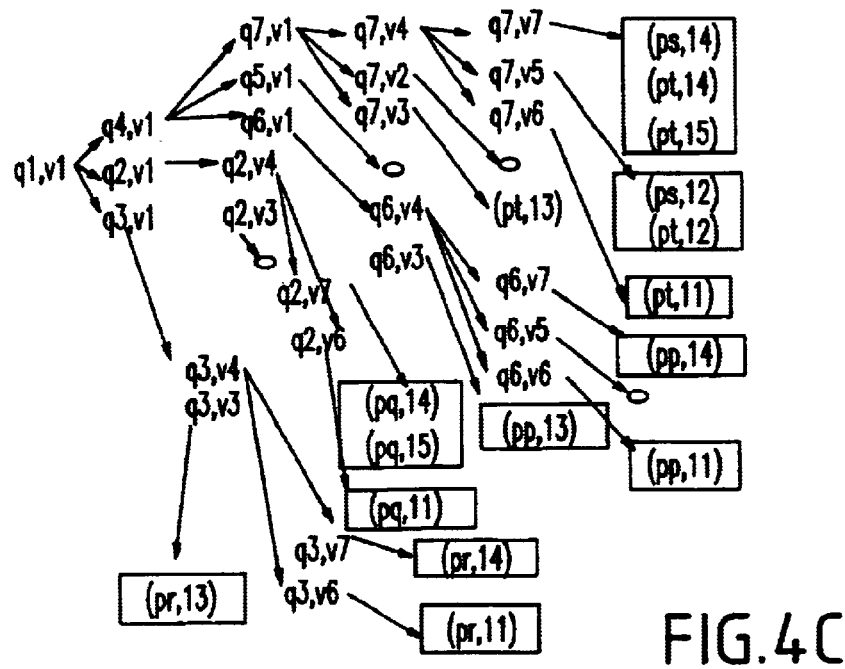
Figure 6:
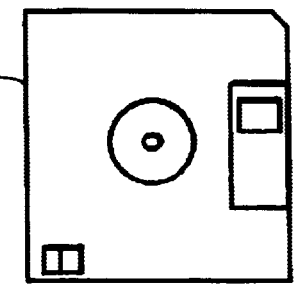
FIG. 6 illustrates a signal bearing medium 600 (e.g., storage medium) for storing steps of a program of a method according to the present invention.

An exemplary IHT search will be explained through an example shown in FIGS. 4(a)–4(c). The database IHT is shown in FIG. 2(c). The corresponding rectangles are labeled as R11,R12,R13,R14 and R15 in FIG. 4 (a). For searching in this tree, a query is selected whose intervals are as shown in FIG. 4(a) labeled as Rpp,Rpq,Rpr,Rps,and Rpt. The corresponding query IHT is shown in FIG. 4(b). A node number is assigned to each node in the two trees to illustrate the order of navigation. The order in which nodes will be examined and the overlap discovered is shown in FIG. 4(c).

It is noted that the left or the right subtree branches are left out during some recursive traversals (e.g., (q2,v7) (q2,v6) but not (q2,v5)). Also, it is noted that the overlap of region-pair (pt,14) is automatically derived from the overlap of region pair (ps,14) without explicit search. It is further noted that all overlapping intervals are found by this process.

Thus, an interval hash tree for a set of n affine intervals uses O(n) storage and can be built in O(nlogn) time. This is because each affine interval is stored in at most one tree node. The dominating time for construction is the sorting of the intervals done at most once on each coordinate, taking O(nlogn) time. Since the tree was generated using median end-points for node splitting, it is a balanced search tree.

Obtaining an estimate of search complexity is difficult, as it depends on the relative placements of query and database affine intervals. For large databases, the pathological cases of query intervals not overlapping any of the database intervals are rare (particularly, since the search has been made affine-invariant), and can be easily detected in the extreme cases, through the use of bounding rectangles at each node of the IHT.

At any level, the search for matches can explore only the left subtree, the right subtree, or the middle branch and/or both left and right subtrees. That is, for query affine intervals that lie to one side of the median point at any node level, only one of the branches is explored. However, for query intervals that straddle a median point, both branches of the tree are explored, suggesting that in some worst cases, it is possible to incur O(n) search. While this may appear wasteful for query intervals that overlap only a few database intervals, it is still better than a linear search per query interval (an $O(n^2)$ operation overall).

When only one of the subtrees is explored, the total time for search of all windows that overlap a query window takes time $O(\log^2 n+K)$ where K is the actual number of intersections, and can be searched in O(log n) time where n is the number of windows. The total time for search for all windows that overlap a query window is O(log n+k) where k is the number of overlapping windows. It is noted also that each window of the database is examined only once since it is only one place in the interval hash tree.

The overlap within database intervals also affects search complexity. Large overlaps within database intervals have the effect of flattening the database IHT so that most of the intervals end up in Iymid branch at each node. In such cases, however, the region ordering in the lists $L_{yabove}$ and $L_{ybelow}$ can actually reduce the search time, since the operation stops as soon as a non-overlapping interval is found.

Since R-trees and their variants also address the problem of finding database rectangles that overlap with query rectangle, their relative merits can be compared in a qualitative manner.

First, as mentioned above, the R-tree variants are targeted towards achieving good paging performance assuming secondary disk storage for data. For the number of affine intervals represented, the IHT is primarily a main-memory data structure. Because of the two-way interval tree organization, however, it is possible to arrive at efficient paging schemes even for IHT by storing the y-interval trees under nodes of x-interval trees in separate pages.

Next, as in R-tree variants, the intermediate nodes in IHT are meant as guiding information, with leaves storing the actual data.

Third, the number of nodes searched in both cases is a function of relative position of the query rectangle and the amount of overlap between database rectangles. When the query does not overlap any of the database rectangles (a rare occurrence in region hashing), R-trees can may detect such outliers faster. However, with the use of bounding rectangles at each interval tree node, the search for such outliers can be made fast even in IHT.

When there is a large amount of overlap between the database rectangles, forced node splitting may occur in R-trees. Such excessive overlap has the effect of flattening the data structure in IHT as explained above, but due to the coordinate ordering information search can be stopped as soon as a non-overlapping interval is found. The search algorithm, however, remains simpler for R-trees.

Finally, it is noted that consolidation of multiple query interval searches into a tree in itself, and the node-wise matching of query IHT to database IHT makes this index structure novel, that has not been explored in R-tree variants.

Figure 5:
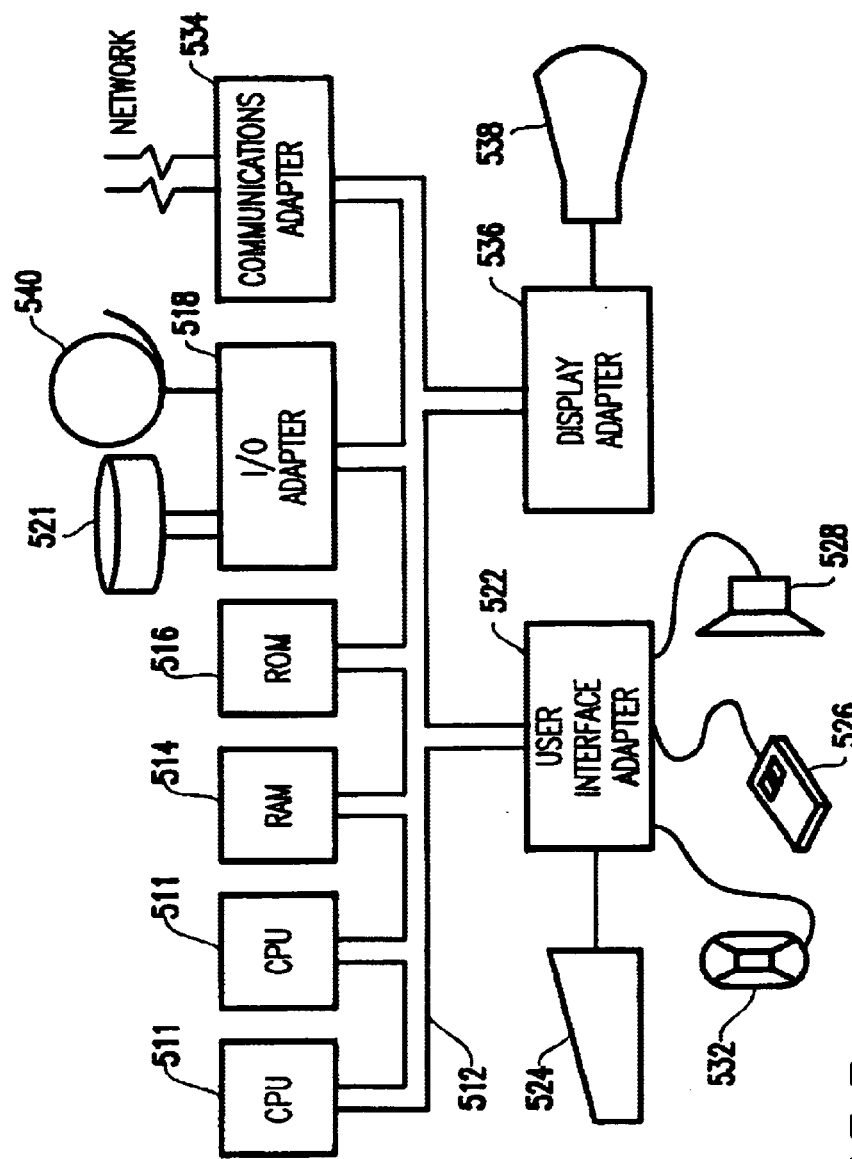
FIG. 5 illustrates an exemplary hardware/information handling system 500 for incorporating the present invention therein.

FIG. 5 illustrates a typical hardware configuration of an information handling/computer system for use with the invention and which preferably has at least one processor or central processing unit (CPU) 511.

The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communication adapter 534 for connecting an information handling system to a data processing network, the Internet, an Intranet, a personal area network (PAN), etc., and a display adapter 536 for connecting the bus 512 to a display device 538 and/or printer. The IHT can be provided in either the main memory (e.g., RAM 514) or can be organized such that part of it lies in the main memory module (RAM 514), while other portions of the tree lie in secondary memory (e.g., disk units 521, tape drives 540, etc.).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

This signal-bearing media may include, for example, a RAM contained within the CPU 511, as represented by the fast-access storage for example. Alternatively, the instructions may be contained in another signal-bearing media, such as a magnetic data storage diskette 600 (FIG. 6), directly or indirectly accessible by the CPU 511.

Whether contained in the diskette 600, the computer/CPU 511, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

With the unique and unobvious features of the present invention, a novel method is provided for simultaneously finding overlap of multiple query windows to multiple, possibly overlapping database windows. Further, the invention uses an interval hash tree, and allows a method of matching two interval hash trees.

Additionally, with the invention, a method is provided for representing indexing information in the database using an interval hash tree. Moreover, the interval hash tree can be used to localize queries in unsegmented images.

While the invention has been described in terms of several preferred embodiments, those skilled in the art will recognize that the invention can be practiced with modification within the spirit and scope of the appended claims.

Having thus described our invention, what we claim as new and desire to secure by Letters Patent is as follows:

1. A method of representing a two-dimensional image database and query information for said two-dimensional image database, comprising:

defining an interval hash tree as a two-dimensional interval tree;

constructing a first interval hash tree for database windows, each of said database windows corresponding to a data unit of an image of said two-dimensional image database;

constructing a second interval hash tree for query windows, each of said query windows corresponding to a data unit of a two-dimensional query image; and matching said second and first interval hash trees node by node, wherein said interval hash tree comprises a two-dimensional ternary interval tree in which a first-level ternary tree called an x-interval tree houses in its middle branch a second-level ternary tree called a y-interval tree, and wherein said interval hash tree comprises a recursive data structure which captures a spatial distribution of a collection of rectangles in a non-redundant form.

2. The method of claim 1, wherein the matching of at least the first and second interval hash trees simultaneously finds a set of database windows that overlap a set of query windows without looking at a single overlapping window.

3. The method of claim 1, wherein indexing information in the two-dimensional image database is represented by said first interval hash tree.

4. The method of claim 1, wherein said second interval hash tree allows localizing said query windows in unsegmented images.

5. The method of claim 1, wherein repeating a search for every query window is avoided based on a representation of each of said query windows with said second interval hash tree and based on said matching said second and first interval hash trees node for node.

6. The method of claim 1, wherein each of said query windows comprises a rectangle that forms an interval of said second interval hash tree.

7. The method of claim 1, further comprising:

performing a simultaneous search of said first interval hash tree and said second interval hash tree, such that a database interval that overlaps more than one query interval is discovered only once.

8. The method of claim 7, wherein said performing said simultaneous search comprises:

creating said first interval hash tree such that a bounding box of all intervals under a tree node of said first interval hash tree is retained as part of node information.

9. The method of claim 1, wherein by choosing said collection of rectangles to be affine intervals, said recursive data structure localizes a query object in unsegmented images of the two-dimensional image database under changes in pose.

10. A method of representing indexing information in a two-dimensional image database, comprising:

constructing a first two-dimensional interval hash tree for multiple query windows to allow query object localization, each of said multiple query windows corresponding to a data unit of a two-dimensional query image;

constructing a second two-dimensional interval hash tree for multiple database windows, each of said multiple database windows corresponding to a data unit of an image of said two-dimensional image database; and matching said first two-dimensional interval hash tree and said second two-dimensional interval hash trees node-by-node, wherein said interval hash tree comprises a two-dimensional ternary interval tree in which a first-level ternary tree called an x-interval tree houses in its middle branch a second-level ternary tree called a y-interval tree, and wherein said interval hash tree comprises a recursive data structure which captures a spatial distribution of a collection of rectangles in a non-redundant form.

11. A method of representing a two-dimensional image database and query information for said two-dimensional image database, comprising:
  creating a two-dimensional database interval hash tree for said two-dimensional image database;
  recording an overlap of windows corresponding to individual data unit images in the two-dimensional image database;
  generating a two-dimensional query interval hash tree including two-dimensional query intervals;
  using each node of the two-dimensional query interval hash tree to search for at least one of matching and overlapping intervals in the two-dimensional database interval hash tree; and
  consolidating said matching and overlapping intervals to find the best data units in the two-dimensional image database,
  wherein said interval hash tree comprises a two-dimensional ternary interval tree in which a first-level ternary tree called an x-interval tree houses in its middle branch a second-level ternary tree called a y-interval tree, and
  wherein said interval hash tree comprises a recursive data structure which captures a spatial distribution of a collection of rectangles in a non-redundant form.

12. A system for representing a two-dimensional image database and query information for said two-dimensional image database, comprising:
  defining an interval hash tree as a two-dimensional interval tree;
  a first interval hash tree for query windows, each of said query windows corresponding to a data unit of a two-dimensional query image;
  a second interval hash tree for database windows, each of said database windows corresponding to a data unit of an image of said two-dimensional image database; and
  means for matching said first and second interval hash trees node by node,
    wherein said interval hash tree comprises a two-dimensional ternary interval tree in which a first-level ternary tree called an x-interval tree houses in its middle branch a second-level ternary tree called a y-interval tree, and
    wherein said interval hash tree comprises a recursive data structure which captures a spatial distribution of a collection of rectangles in a non-redundant form.

13. The system of claim 12, wherein said interval hash tree comprises a two-dimensional ternary interval tree in which a first-level ternary tree called an x-interval tree houses in its middle branch a second-level ternary tree called a y-interval tree, and
  wherein said interval hash tree comprises a recursive data structure which captures a spatial distribution of a collection of rectangles in a non-redundant form.

14. The method of claim 13, further comprising means for choosing the collection of rectangles to be affine intervals, such that said recursive data structure localizes a query object in unsegmented images of the two-dimensional image database under changes in pose.

15. The system of claim 12, wherein said means for matching of the first and second interval hash trees simultaneously finds a set of database windows that overlap a set of query windows without looking at a single non-overlapping window.

16. The system of claim 12, wherein indexing information in the two-dimensional image database is represented by said second interval hash tree.

17. The system of claim 12, wherein said second interval hash tree allows localizing said query windows in unsegmented images.

18. The system of claim 12, wherein repeating a search for every query window is avoided based on a representation of each of said query windows with said second interval hash tree and based on said means for matching said first and second interval hash trees node by node.

19. The system of claim 12, wherein each of the query windows comprises a rectangle that forms an interval of said first interval hash tree.

20. The system of claim 12, further comprising:
  means for performing a simultaneous search of said first interval hash tree and said second interval hash tree, such that a database interval that overlaps more than one query interval is discovered only once.

21. The system of claim 20, wherein said means for performing said simultaneous search comprises:
  means for creating said first interval hash tree such that a bounding box of all intervals under a tree node of said first interval hash tree is retained as part of node information.

22. A signal-bearing medium tangibly embodying a program of machine-readable instructions executable by a digital processing apparatus to perform a method of representing a two-dimensional image database and query information for said two-dimensional image database, comprising:
  defining an interval hash tree as a two-dimensional interval tree;
  constructing a first interval hash tree for query windows, each of said query windows corresponding to a data unit of a two-dimensional query image;
  constructing a second interval hash tree for database windows, each of said database windows corresponding to a data unit of an image of said two-dimensional image database; and
  matching said first and second interval hash trees node by node
    wherein said interval hash tree comprises a two-dimensional ternary interval tree in which a first-level ternary tree called an x-interval tree houses in its middle branch a second-level ternary tree called a y-interval tree, and
    wherein said interval hash tree comprises a recursive data structure which captures a spatial distribution of a collection of rectangles in a non-redundant form.

23. A signal-bearing medium tangibly embodying a program of machine-readable instructions executable by a digital processing apparatus to perform a method of representing indexing information in a two-dimensional image database, comprising:
  constructing a first two-dimensional interval hash tree for multiple query windows to allow query object localization;
  constructing a second two-dimensional interval hash tree for multiple database windows, each of said multiple database windows corresponding to a data unit of an image of said two-dimensional image database, and said indexing information in the two-dimensional image database being represented by said two-dimensional interval hash tree; and
  matching said first two-dimensional interval hash tree and said second two-dimensional interval hash trees node by node,
    wherein said interval hash tree comprises a two-dimensional ternary interval tree in which a first-level ternary tree called an x-interval tree houses in its middle branch a second-level ternary tree called a y-interval tree, and wherein said interval hash tree comprises a recursive data structure which captures a spatial distribution of a collection of rectangles in a non-redundant form.

24. A signal-bearing medium tangibly embodying a program of machine-readable instructions executable by a digital processing apparatus to perform a method of representing a two-dimensional image database and query information for said two-dimensional image database, comprising:

creating a two-dimensional database interval hash tree for said two-dimensional image database;

recording an overlap of windows corresponding to individual data unit images in the two-dimensional image database;

generating a two-dimensional query interval hash tree including two-dimensional query intervals;

using each node of the two-dimensional query interval hash tree to search for at least one of matching and overlapping intervals in the two-dimensional database interval hash tree; and consolidating said matching and overlapping intervals to find the best data units in the two-dimensional image database, wherein said interval hash tree comprises a two-dimensional ternary interval tree in which a first-level ternary tree called an x-interval tree houses in its middle branch a second-level ternary tree called a y-interval tree, and wherein said interval hash tree comprises a recursive data structure which captures a spatial distribution of a collection of rectangles in a non-redundant form.

25. A method of representing a multi-dimensional image database and query information for said multi-dimensional image database, comprising:

defining an interval hash tree as a multi-dimensional interval tree;

constructing a first interval hash tree for database windows, each of said database windows corresponding to a first data unit of an image of said multi-dimensional image database;

constructing a second interval hash tree for query windows, each of said query windows corresponding to a second data unit of a multi-dimensional query image; and matching at least said first multi-dimensional interval hash tree and said second multi-dimensional interval hash trees node by node, wherein said interval hash tree comprises a multi-dimensional interval tree in which a first-level tree called an x-interval tree houses in a branch a second-level tree called a y-interval tree, and wherein said interval hash tree comprises a recursive data structure which captures a spatial distribution of a collection of rectangles in a non-redundant form.

* * * * *